US008963065B2

(12) United States Patent
Liu

(10) Patent No.: US 8,963,065 B2
(45) Date of Patent: Feb. 24, 2015

(54) SENSING DEVICE AND METHOD FOR OPERATING SAME

(75) Inventor: Chun-Kai Liu, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 346 days.

(21) Appl. No.: 13/441,449

(22) Filed: Apr. 6, 2012

(65) Prior Publication Data

US 2012/0256079 A1 Oct. 11, 2012

(30) Foreign Application Priority Data

Apr. 7, 2011 (TW) .............................. 100112111 A

(51) Int. Cl.
*H01L 27/00* (2006.01)
*H04N 3/14* (2006.01)
*H04N 5/341* (2011.01)
*H04N 5/345* (2011.01)
*H04N 5/374* (2011.01)
*H04N 5/376* (2011.01)

(52) U.S. Cl.
CPC ............. *H04N 5/341* (2013.01); *H04N 5/3454* (2013.01); *H04N 5/3742* (2013.01); *H04N 5/376* (2013.01)
USPC ...................................... 250/208.1; 348/308

(58) Field of Classification Search
CPC ........ H04N 5/374; H04N 5/376; H04N 5/378
USPC ................................ 250/208.1; 348/241, 308
See application file for complete search history.

(56) References Cited

U.S. PATENT DOCUMENTS

| 7,488,928 B2 * | 2/2009 | Krymski ................... 250/208.1 |
| 2005/0253947 A1 | 11/2005 | Kim et al. |
| 2008/0079832 A1 | 4/2008 | Chou |

\* cited by examiner

*Primary Examiner* — Thanh Luu
(74) *Attorney, Agent, or Firm* — Muncy, Geissler, Olds & Lowe, P.C.

(57) ABSTRACT

An array of active pixel sensors and an array of sampling circuits of an active image sensor are divided into sub-arrays in operation so that a sampling time and a readout time in a frame overlap to each other to shorten the total readout time of a frame. In an embodiment, a first sub-array of sampling circuits samples a first sub-array of active pixel sensors during a readout circuit reads out sampled signals from a second sub-array of sampling circuits, or the second sub-array of sampling circuits samples a second sub-array of active pixel sensors during the readout circuit reads out sampled signals from the first sub-array of sampling circuits.

6 Claims, 6 Drawing Sheets

US 8,963,065 B2

SENSING DEVICE AND METHOD FOR OPERATING SAME

FIELD OF THE INVENTION

The present invention is related generally to an image sensor and, more particularly, to circuit and method for an active image sensor.

BACKGROUND OF THE INVENTION

FIG. 1 is a conventional circuit for an optical sensor, which uses an active pixel sensor (APS) 10 as an optical detector, and a correlated double sampling (CDS) circuit 12 to eliminate fixed pattern noise (FPN) caused by mismatch in the manufacturing processes of the active pixel sensor 10. The active pixel sensor 10 includes a photodiode Dphoto, a reset switch Q1, a source follower Q2 and a position select switch Q3. Before an optical sensing process begins, a signal ROW_RST turns on the reset switch Q1 to reset the voltage Va at the cathode of the photodiode Dphoto, and then the reset switch Q1 is turned off so as for the optical detection of the photodiode Dphoto, by which the photodiode Dphoto will generate a photoelectric current responsive to the optical intensity and thereby discharges the cathode Va thereof, and as a result the voltage Va is decreased by ΔVa, which is proportional to the optical intensity imparted on the photodiode Dphoto. The source follower Q2 shifts the level of the voltage Va to be a voltage Vo, which will be sent out when the position select switch Q3 is turned on by a signal ROW_SEL. In the process of sampling the output voltage Vo of the active pixel sensor 10 by the CDS circuit 12, a signal SHS turns on a switch for a period of time so that the voltage Vo generated by the optical detection of the photodiode Dphoto is stored into a capacitor CS to generate a sampled voltage VS, then a signal SHR turns on another switch for a period of time so that the voltage Vo generated when the photodiode Dphoto is reset is stored into a capacitor CR to generate a sampled voltage VR, and a signal COL_SEL controls yet another switches to send out the sampled voltages VR and VS. As the sampled voltage VR results from FPN and the sampled voltage VS includes both FPN and the voltage generated by the optical detection of the photodiode Dphoto, the difference thereof, i.e. VS−VR, is the actual optical sensed value excluding FPN. Thus, image quality can be effectively enhanced.

FIG. 2 is a circuit diagram of a conventional active image sensor, which includes an array 14 of active pixel sensors 10, an array 16 of sampling circuits 12 and a readout circuit 18. For example, the circuits of the active pixel sensor 10 and the sampling circuit 12 are the same as that shown in FIG. 1. The number of the sampling circuits 12 in the array 16 is equal to the number of the active pixel sensors 10 of a row in the array 14. For example, the array 14 is composed of 256 active pixel sensors 10 arranged as a 16×16 array, and the array 16 is composed of 16 sampling circuits 12 arranged as a 16×1 array. FIG. 3 is a timing diagram of the active image sensor shown in FIG. 2. In reading out the optical sensed values of a frame from the array 14, signals ROW_SEL[1]-[16] are used to select the rows in the array 14 one by one, so as for the array 16 to sample the optical sensed values of the selected row. Each time the array 16 samples the optical sensed values of a row, and the sampling time of each row is T1. After the array 16 samples the optical sensed values of a row, the readout circuit 18 uses signals COL_SEL[1]-[16] to select the columns one by one to read out the sampled signals of all the pixels in the array 16, and the readout time of each row is T2. Then, the readout circuit 18 will convert the sampled signals into an 8-bit digital signal DO[7:0] and send out the digital signal DO[7:0] together with a synchronous clock ADEND. As the time required to sample and read out the pixels in each row is the sum T1+T2 and the array 14 has 16 rows, the time required to read out the entire array 14, i.e. the readout time of a frame, is (T1+T2)×16.

SUMMARY OF THE INVENTION

An objective of the present invention is to provide a circuit and method for an active image sensor.

According to the present invention, an active image sensor includes an array of active pixel sensors, an array of sampling circuits and a readout circuit, the array of active pixel sensors includes two sub-arrays, the array of sampling circuits includes two sub-arrays, and the second one of the two sub-arrays of sampling circuits samples the second one of the two sub-arrays of active pixel sensors during the readout circuit reads the first one of the two sub-arrays of sampling circuits, or the first one of the two sub-arrays of sampling circuits samples the first one of the two sub-arrays of active pixel sensors during the readout circuit reads the second one of the two sub-arrays of sampling circuits.

According to the present invention, a method for an active image sensor having an array of active pixel sensors including two sub-arrays samples the first one of the two sub-arrays during reading out sampled signals generated by the second one of the two sub-arrays, or samples the second one of the two sub-arrays during reading out sampled signals generated by the first one of the two sub-arrays.

By overlapping the readout time and sampling time in a frame, the total readout time of a frame is shortened.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

A major feature of the present invention is to divide the array of active pixel sensors and the array of sampling circuits of an active image sensor into sub-arrays in operation so that, by a hardware-based division, the sampling time and the readout time in a frame overlap to each other to shorten the total readout time of a frame.

Figure 1:
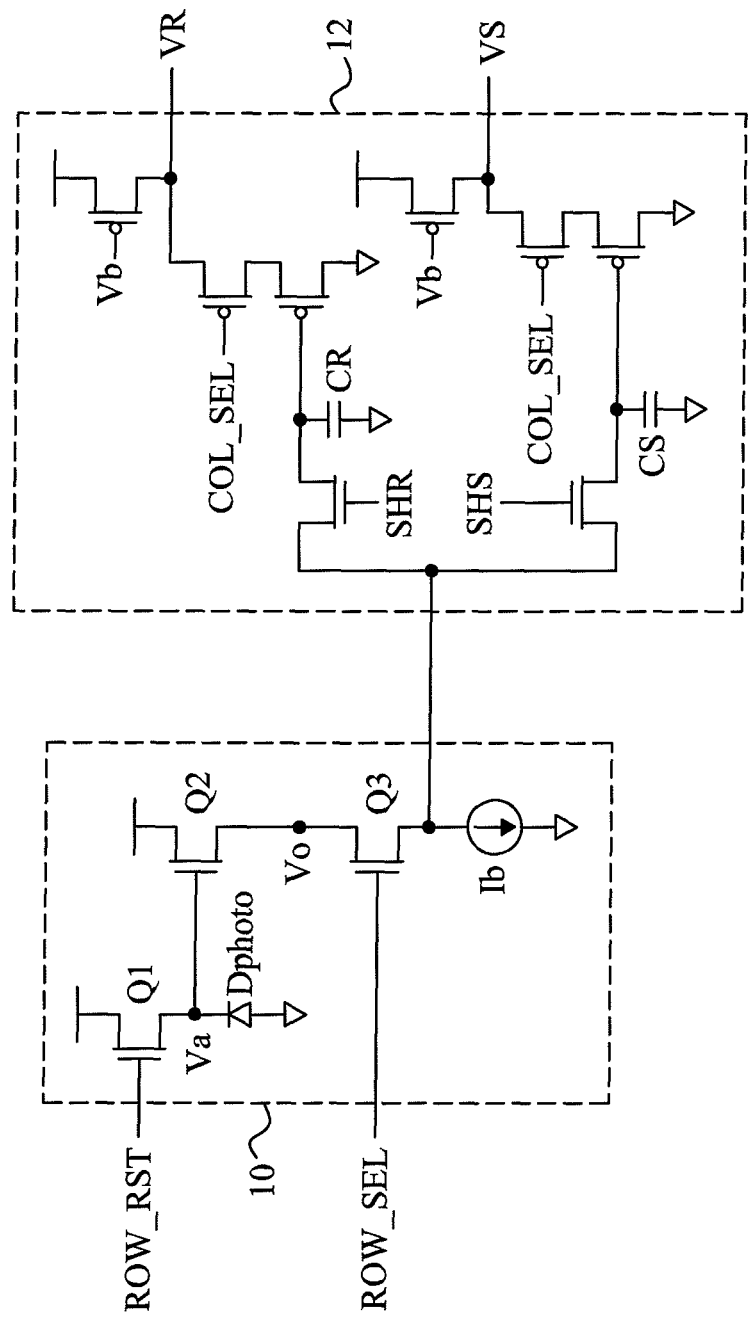
FIG. 1 is a conventional circuit for an optical sensor.
Figure 2:
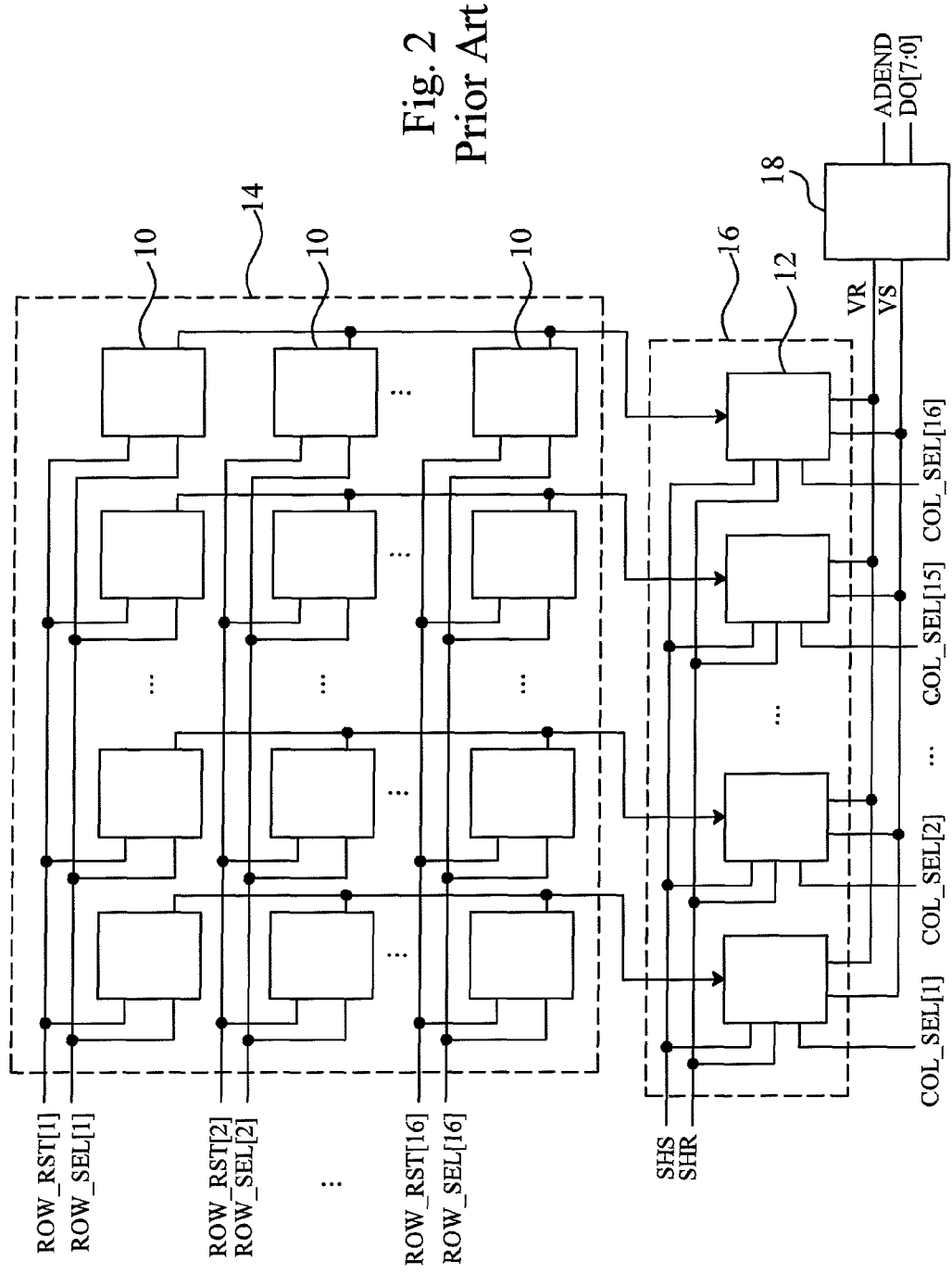
FIG. 2 is a circuit diagram of a conventional active image sensor.
Figure 3:
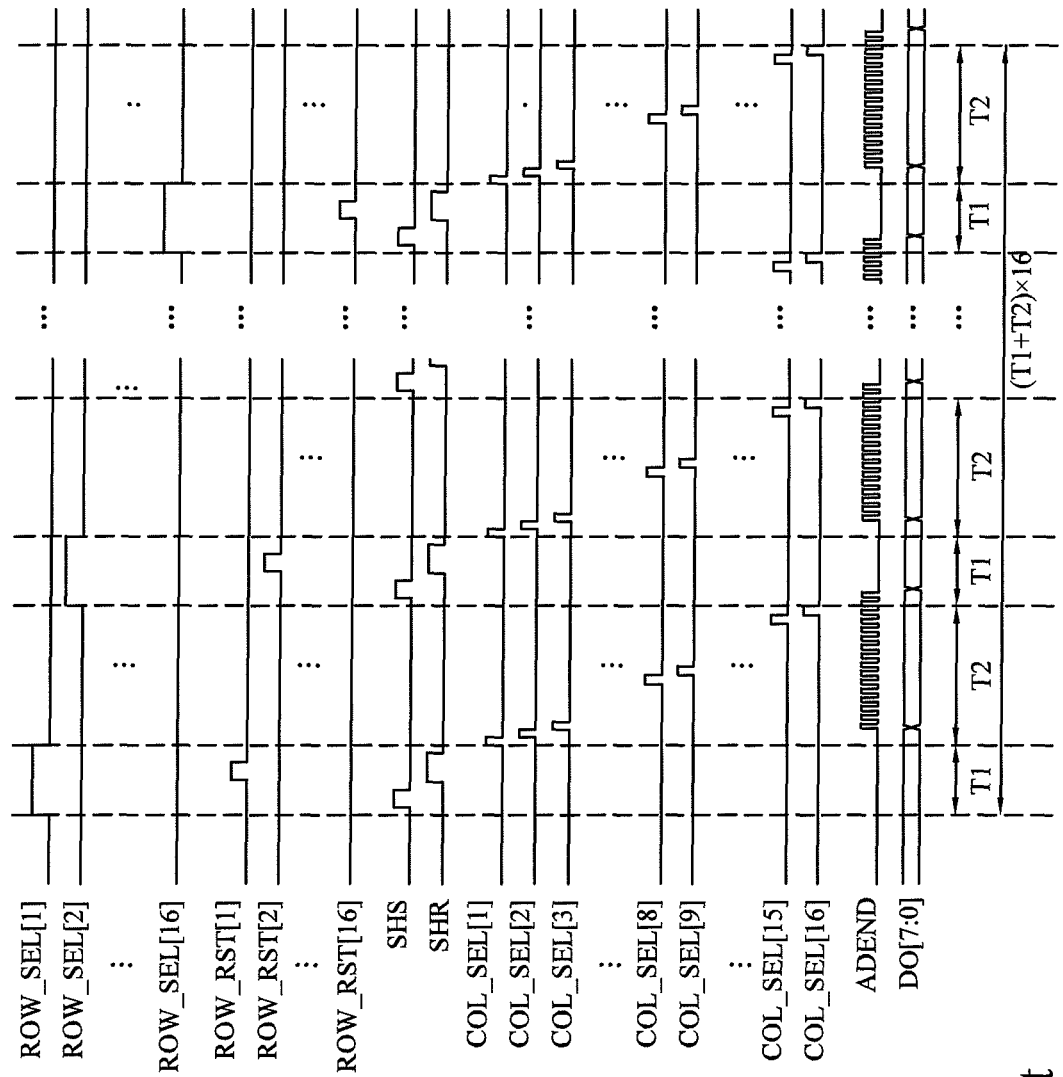
FIG. 3 is a timing diagram of the active image sensor shown in FIG. 2.
Figure 4:
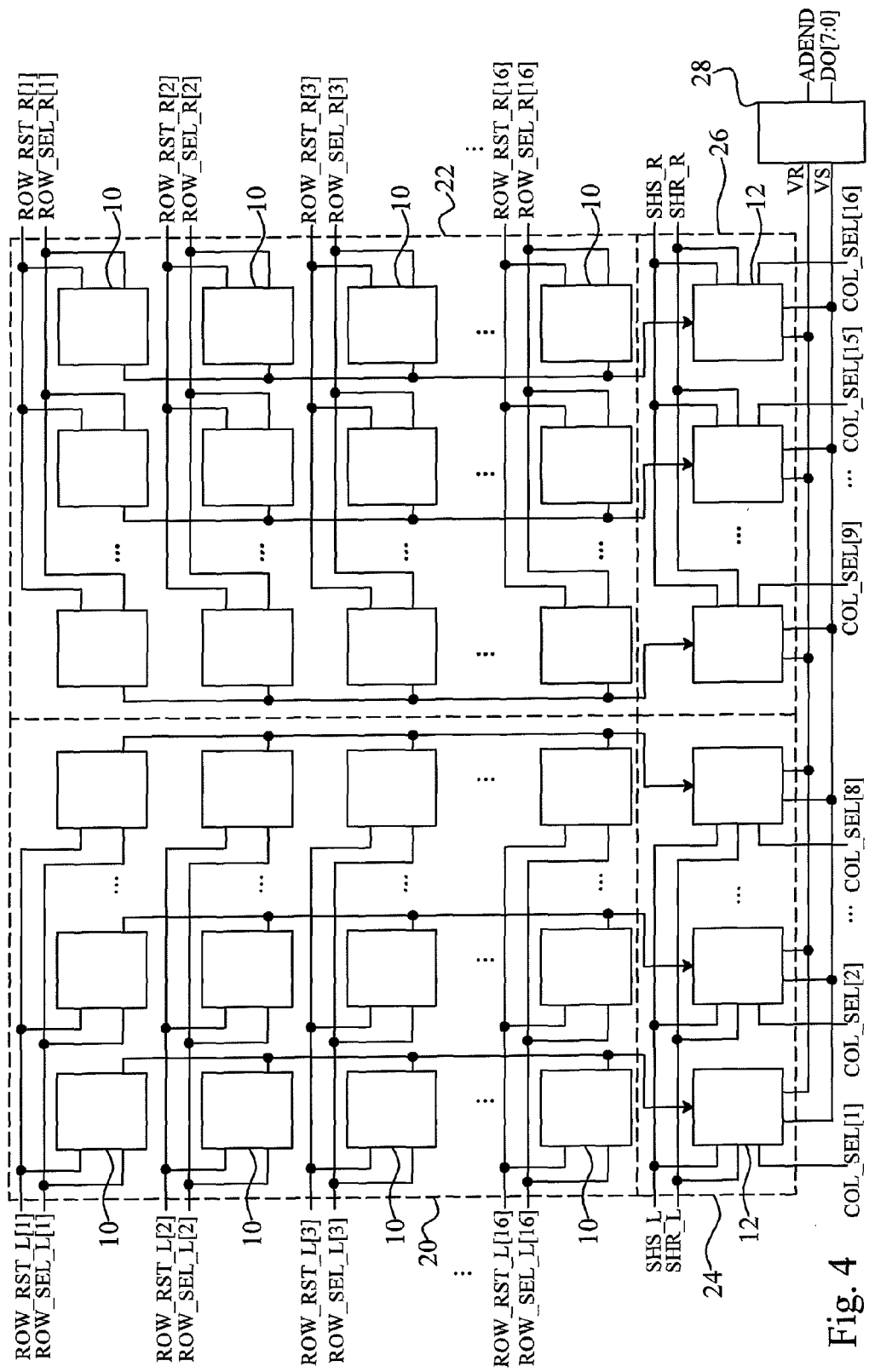
FIG. 4 is a circuit diagram of an active image sensor according to an embodiment of the present invention.
Figure 5:
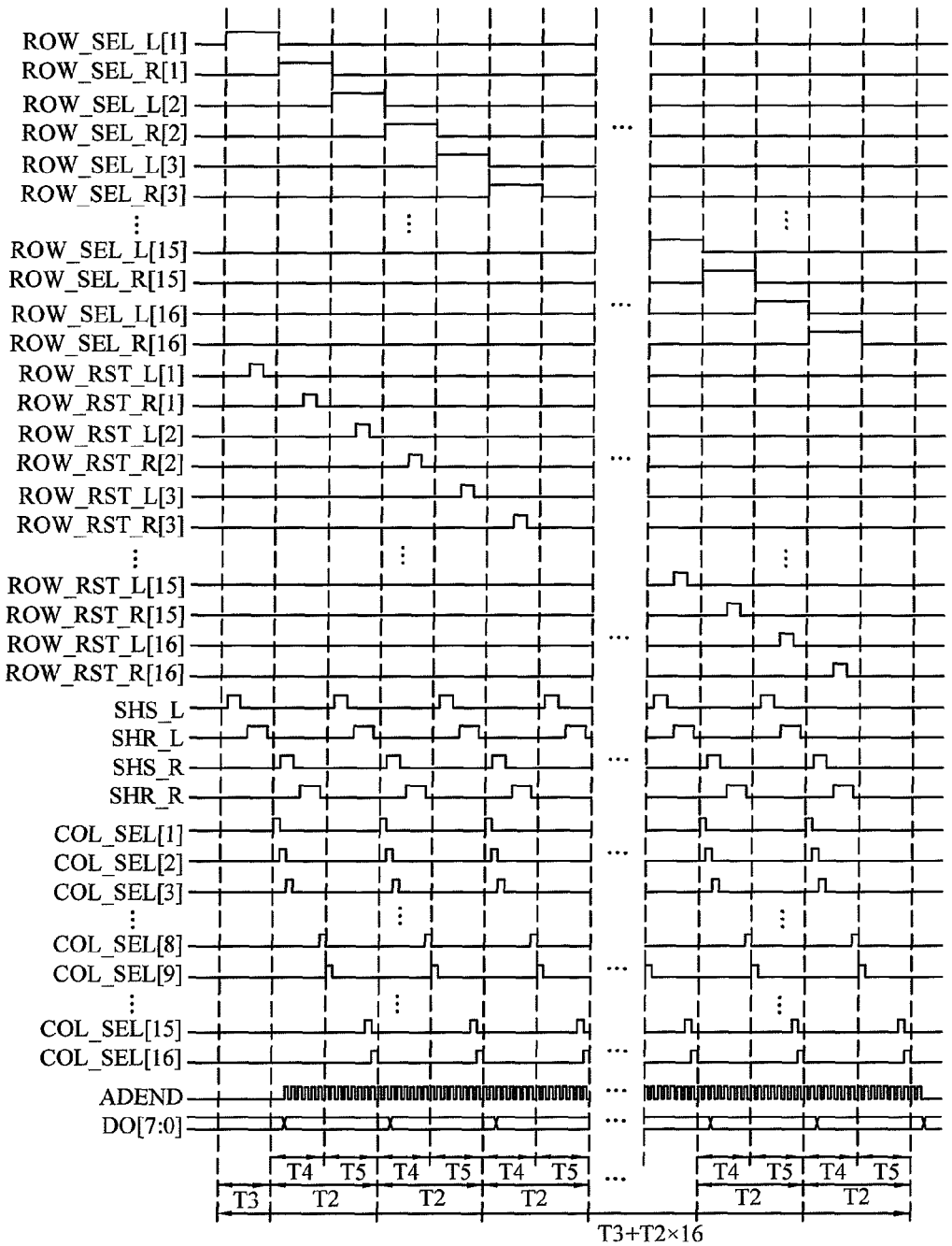
FIG. 5 is a timing diagram of the active image sensor shown in FIG. 4.

FIG. 4 is a circuit diagram of an active image sensor according to an embodiment of the present invention, which includes two sub-arrays 20 and 22 of active pixel sensors 10, two sub-arrays 24 and 26 of sampling circuits 12 connected to the two sub-arrays 20 and 22 respectively, and a readout circuit 28 for reading out the sampled signals from the two sub-arrays 24 and 26. Compared to FIG. 2, in this embodiment, the original 16×16 array 14 is divided into the two 8×16 sub-arrays 20 and 22, and the original 16×1 array 16 is divided into the two 8×1 sub-arrays 24 and 26. Based upon such division, in reading out the optical sensed values of a frame, the operation can be changed in the way that the readout time of the sub-array 24 overlaps the sampling time of the sub-array 22, or the readout time of the sub-array 26 overlaps the sampling time of the sub-array 20. FIG. 5 is a timing diagram of the active image sensor shown in FIG. 4 in an embodiment. Referring to FIGS. 4 and 5, signals ROW_SEL_L[1]-[16] are used to select among the rows in the sub-array 20 so as for the sub-array 24 to sample the selected row in the sub-array 20, and the sampling time of each row in the sub-array 20 is T3. Next, the readout circuit 28 uses signals COL_SEL[1]-[8] to select the columns in the sub-array 24 one by one to read out the sampled signals of all the pixels in the sub-array 24, and the readout time of the row in the sub-array 24 is T4. The readout circuit 28 will convert the sampled signals into an 8-bit digital signal DO[7:0] and send out the digital signal DO[7:0] along with a synchronous clock ADEND. In the course where the readout circuit 28 reads out the sampled signals of the sub-array 24, signals ROW_SEL_R[1]-[16] are used to select among the rows in the sub-array 22 so as for the sub-array 26 to sample the selected row. Once the readout circuit 28 completes reading out the sampled signals of the sub-array 24, the readout circuit 28 uses signals COL_SEL[9]-[16] to select the columns in the sub-array 26 one by one to read out the sampled signals of all the pixels in the sub-array 26, and the readout time of the row in the sub-array 26 is T5. The sum T4+T5 can be regarded as T2 shown in FIG. 3. Likewise, during the readout circuit 28 reads out the sampled signals of the sub-array 26, the sub-array 24 samples the next row of the sub-array 20. Preferably, T3=T4=T5 to facilitate hardware design. By sampling and reading in such an alternating manner, the pixels in the entire 16×16 array of active pixel sensors are read out with the total readout time of a frame T3+T2×16.

Figure 6:
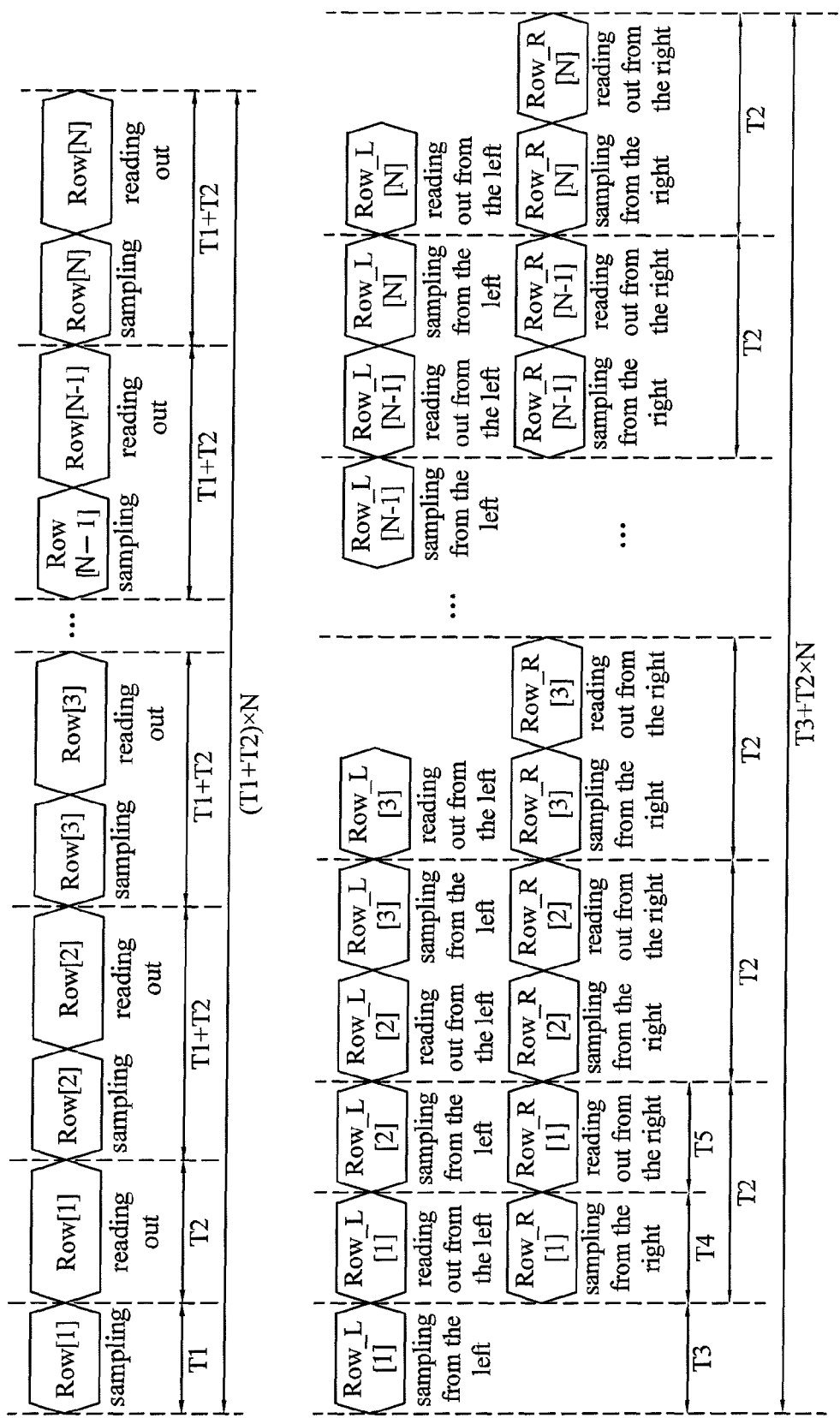
FIG. 6 is a comparison of timing diagrams of a conventional active image sensor and an active image sensor according to present invention.

FIG. 6 is a comparison of timing diagrams of a conventional active image sensor and an active image sensor according to present invention. For sensing N rows of an array of active pixel sensors, the total readout time of a frame in the conventional active image sensor is (T1+T2)×N; whereas the total readout time of a frame in the active image sensor according to the present invention is T3+T2×N. Obviously, the total readout time of a frame according to the present invention is the shorter. Therefore, in practical applications such as optical mice, the present invention can increase the number of sampled frames per second or, given a fixed frame rate, increase the time interval between readout time of two consecutive frames, and increase power efficiency by turning off the DC power consumption to the integrated circuit during the time interval as appropriate.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A sensing device, comprising:
    an array of active pixel sensors, including a first sub-array and a second sub-array;
    a first set of sampling circuits connected to the first sub-array for sampling the first sub-array to generate a first set of analog signals;
    a second set of sampling circuits connected to the second sub-array for sampling the second sub-array to generate a second set of analog signals; and
    a readout circuit connected to both of the two sets of sampling circuits for sequentially reading the first set of analog signals and the second set of analog signals and performing analog to digital conversion to generate a plurality of digital signals;
    wherein the second set of sampling circuits samples the second sub-array while the readout circuit reads the first set of analog signals and performs the analog to digital conversion, and wherein the first set of sampling circuits samples the first sub-array while the readout circuit reads the second set of analog signals and performs the analog to digital conversion;
    wherein the first sub-array comprises a plurality of first rows and one of the first rows is adjacent to another of the first rows in a first direction;
    wherein the second sub-array comprises a plurality of second rows and one of the second rows is adjacent to another of the second rows in the first direction; and
    wherein the first sub-array is disposed adjacent to the second sub-array in a second direction which is different from the first direction.

2. The device of claim 1, wherein the two sets of sampling circuits perform correlated double sampling for sampling the two sub-arrays.

3. The device of claim 1, wherein a number of sampling circuits in the first set of sampling circuits is equal to a number of active pixel sensors in a row of the first sub-array, and wherein a number of sampling circuits in the second set of sampling circuits is equal to a number of active pixel sensors in a row of the second sub-array.

4. A method for a sensing device having an array of active pixel sensors including a first sub-array and a second sub-array, comprising steps of:
    A.) sampling the first sub-array to generate a first set of analog signals;
    B.) sampling the second sub-array to generate a second set of analog signals; and
    C.) sequentially reading the first set of analog signals and the second set of analog signals and performing analog to digital conversion;
    wherein the second sub-array is sampled while the first set of analog signals are read and converted into a first set of digital signals, wherein the first sub-array is sampled while the second analog signals are read and converted into a second set of digital signals;
    wherein the first sub-array comprises a plurality of first rows and one of the first rows is adjacent to another of the first rows in a first direction;
    wherein the second sub-array comprises a plurality of second rows and one of the second rows is adjacent to another of the second rows in the first direction; and
    wherein the first sub-array is disposed adjacent to the second sub-array in a second direction which is different from the first direction.

5. The method of claim 4, wherein the step A comprises a step of correlated double sampling for sampling the first sub-array.

6. The method of claim 4, wherein the step B comprises a step of correlated double sampling for sampling the second sub-array.

* * * * *